US010333672B2

(12) United States Patent
Nagaraja et al.

(10) Patent No.: US 10,333,672 B2
(45) Date of Patent: Jun. 25, 2019

(54) SEMI-PERSISTENT MEASUREMENT REFERENCE SIGNAL (MRS) CONFIGURATION

(71) Applicant: QUALCOMM Incorporated, San Diego, CA (US)

(72) Inventors: Sumeeth Nagaraja, San Diego, CA (US); Tao Luo, San Diego, CA (US); Sony Akkarakaran, Poway, CA (US); Kaushik Chakraborty, San Diego, CA (US); Makesh Pravin John Wilson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/658,682

(22) Filed: Jul. 25, 2017

(65) Prior Publication Data
US 2018/0034611 A1 Feb. 1, 2018

Related U.S. Application Data

(60) Provisional application No. 62/368,106, filed on Jul. 28, 2016.

(51) Int. Cl.
H04L 5/00 (2006.01)
H04W 72/04 (2009.01)
H04W 24/02 (2009.01)

(52) U.S. Cl.
CPC .......... H04L 5/0048 (2013.01); H04W 24/02 (2013.01); H04W 72/042 (2013.01)

(58) Field of Classification Search
CPC .... H04W 72/042; H04W 24/02; H04L 5/0048
See application file for complete search history.

(56) References Cited

U.S. PATENT DOCUMENTS 8,989,114 B2 * 3/2015 Kim .................. H04B 7/024
370/329
9,094,977 B2 7/2015 Li et al.
(Continued)

OTHER PUBLICATIONS

Catt: "Beam Management", 3GPP Draft; R2-1704228_BEAM MANAGEMENT_V2, 3rd Generation Partnership Project (3GPP), Mobile Competence Centre; 650, Route Des Lucioles; F-06921 Sophia-Antipolis Cedex; France, vol. RAN WG2, No. Hangzhou, China; May 6, 2017, XP051264316, Retrieved from the Internet: URL:http://www.3gpp.org/ftp/tsg_ran/WG2_RL2/TSGR2_98/Docs/ [retrieved on May 6, 2017], 4 pages.

(Continued)

Primary Examiner — Wayne H Cai
(74) Attorney, Agent, or Firm — Patterson & Sheridan, L.L.P.

(57) ABSTRACT

Aspects of the present disclosure relate to wireless communications and, more particularly, to semi-persistent configuration of reference signals (RSs), such as measurement reference signals (MRSs) for beam refinement. An example method generally includes transmitting, to a user equipment (UE), a reference symbol (RS) configuration, wherein transmitting the RS configuration is independent of activating RS training for the UE, transmitting, to the UE, a message indicating an activation of RS training subsequent to transmitting the RS configuration, transmitting RSs to the UE periodically based on the RS configuration, and receiving, from the UE, measurement reports based on the transmitted RS.

28 Claims, 12 Drawing Sheets

(56) References Cited

U.S. PATENT DOCUMENTS

| | | | |
|---|---|---|---|
| 2014/0029458 A1* | 1/2014 | Ye | H04W 24/10 370/252 |
| 2014/0044040 A1 | 2/2014 | Chen et al. | |
| 2015/0098341 A1 | 4/2015 | Ramkumar et al. | |
| 2015/0245326 A1 | 8/2015 | Rune et al. | |
| 2016/0157218 A1* | 6/2016 | Nam | H04B 7/0456 370/329 |
| 2016/0183275 A1* | 6/2016 | Inoue | H04B 7/0695 455/450 |

OTHER PUBLICATIONS

International Search Report and Written Opinion—PCT/US2017/043824—ISA/EPO—Oct. 6, 2017.

NTT Docomo et al., "Discussion on CSI-RS Enhancement for Beamformed CSI-RS", 3GPP Draft; R1-167347, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 21, 2016, XP051125857, Retrieved from the Internet: URL:http://www.3gpp.org/ftp/Meetings_3GPP_SYNC/RAN1/Docs [retrieved on Aug. 21, 2016], 3 pages.

Qualcomm Incorporated: "Discussion on Hybrid CSI-RS based Operation for eFD-MIMO", 3GPP Draft; R1-164431, 3rd Generation Partnership Project (3GPP), Mobile Competence Centre; 650, Route Des Lucioles; F-06921 Sophia-Antipolis Cedex; France, vol. RAN WG1, No. Nanjing. China; May 14, 2016, XP051096449, Retrieved from the Internet: URL:http://www.3gpp.org/ftp/tsg ran/WG1_RL1/TSGR1_85/Docs/ [retrieved on May 14, 2016], 5 pages.

Qualcomm Incorporated: "Enhancements on Beamformed CSI-RS for eFD-MIMO", 3GPP Draft; R1-164428, 3rd Generation Partnership Project (3GPP), Mobile Competence Centre; 650, Route Des Lucioles; F-06921 Sophia-Antipolis Cedex; France, vol. RAN WG1, No. Nanjing, China; May 14, 2016, XP051096451, Retrieved from the Internet: URL:http://www.3gpp.org/ftp/tsg_ran/WG1_RL1/TSGR1_85/Docs/ [retrieved on May 14, 2016], 5 pages.

Samsung et al., "WF on RS design for CSI Measurements in NR", 3GPP Draft; R1-165701, 3rd Generation Partnership Project (3GPP), Mobile Competence Centre; 650, Route Des Lucioles; F-06921 Sophia-Antipolis Cedex, France, vol. RAN WG1. No. Nanjing, China; May 30, 2016, XP051111887, Retrieved from the Internet: URL:http://www.3gpp.org/ftp/tsg_ran/WG1_RL1/TSGR1_85/Docs/ [retrieved on May 30, 2016], 2 pages.

* cited by examiner

SEMI-PERSISTENT MEASUREMENT REFERENCE SIGNAL (MRS) CONFIGURATION

CROSS-REFERENCE TO RELATED APPLICATIONS

This application claims benefit of U.S. Provisional Patent Application Ser. No. 62/368,106, entitled "Semi-Persistent Measurement Reference Symbol (MRS) Measurement," filed Jul. 28, 2016, and assigned to the assignee hereof, the contents of which are herein included by reference in its entirety.

BACKGROUND

Field of the Disclosure

Aspects of the present disclosure generally relate to wireless communication and, more particularly, to semi-persistent measurement reference symbol configuration for beam selection and refinement.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations (e.g., Node B, evolved Node B (eNB), Access Point (AP), Base Station Transceiver (BST), Transmit/Receive Point (TRP)) to the terminals, and the reverse link (or uplink) refers to the communication link from the terminals to the base stations. This communication link may be established via a single-input single-output, multiple-input single-output or a multiple-input multiple-output (MIMO) system.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure generally relate to semi-persistent reference symbol (RS) configuration for beam selection and refinement.

Certain aspects of the present disclosure provide a method for wireless communication by a Transmit Receive Point (TRP). The method generally includes transmitting, to a user equipment (UE), a reference symbol (RS) configuration, wherein transmitting the RS configuration is independent of activating RS training for the UE, transmitting, to the UE, a message indicating an activation of RS training subsequent to transmitting the RS configuration, transmitting RSs to the UE periodically based on the RS configuration, and receiving, from the UE, measurement reports based on the transmitted RS.

Certain aspects of the present disclosure provide a method for wireless communication by a user equipment (UE). The method generally includes receiving, from a Transmit Receive Point (TRPTRP), a reference symbol (RS) configuration, wherein receiving the RS configuration is independent of an activation of RS training, receiving, from the TRP, a message indicating an activation of RS training, receiving an RS from the TRP periodically based on the RS configuration, and transmitting, to the TRP, measurement reports based on the received RS.

Certain aspects of the present disclosure provide an apparatus for wireless communication. The apparatus generally includes a processor configured to transmit, to a user equipment (UE), a reference symbol (RS) configuration, wherein transmitting the RS configuration is independent of activating RS training for the UE, transmitting, to the UE, a message indicating an activation of RS training subsequent to transmitting the RS configuration, transmitting RSs to the UE periodically based on the RS configuration, and receiving, from the UE, measurement reports based on the transmitted RS, and a memory coupled to the processor.

Certain aspects of the present disclosure provide a method for wireless communication. The apparatus generally includes a processor configured to receive, from a Transmit Receive Point (TRP), a reference symbol (RS) configuration, wherein receiving the RS configuration is independent of an activation of RS training, receiving, from the TRP, a message indicating an activation of RS training, receiving an RS from the TRP periodically based on the RS configuration, and transmitting, to the TRP, measurement reports based on the received RS.

Aspects generally include methods, apparatus, systems, computer program products, and processing systems, as substantially described herein with reference to and as illustrated by the accompanying drawings.

Other aspects, features, and embodiments of the present invention will become apparent to those of ordinary skill in the art, upon reviewing the following description of specific, exemplary aspects of the present invention in conjunction with the accompanying figures. While features of the present disclosure may be discussed relative to certain aspects and figures below, all embodiments of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method aspects it should be understood that such exemplary aspects can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
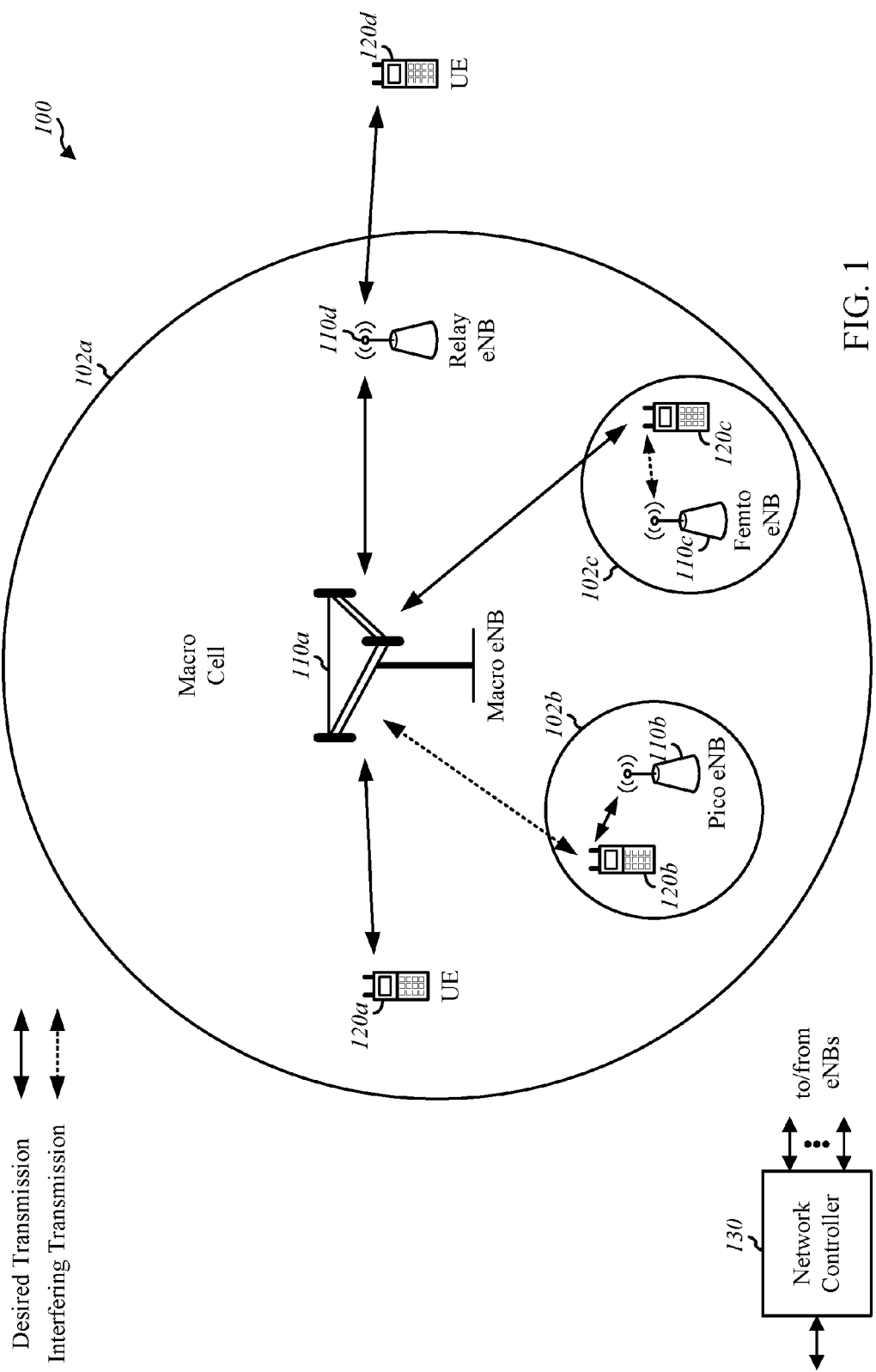
FIG. 1 illustrates an example of a wireless communication network, in accordance with certain aspects of the present disclosure.

Aspects of the present disclosure relate to semi-persistent configuration of reference symbols (RSs), such as measurement reference symbols (MRSs) or channel state information reference symbols (CSI-RSs), used in a beam management and refine procedure. As described herein, spectrum bands in high frequencies (e.g., 28 GHz, may be referred to as millimeter-wave (mmWave)) provide large bandwidths capable of delivering multi-Gbps data rates, as well as extremely dense spatial reuse which may increase capacity. At higher frequencies, in which mmWaves operate, small wavelengths enable a large number of antenna elements in a relatively small form factor. This characteristic of mmWave may be leveraged to form directional beams that may send and receive more energy to overcome propagation and path loss challenges. These beams can also be utilized for spatial reuse.

mmWave communications bring gigabit speeds to cellular networks, due to availability of large amounts of bandwidth. The unique challenges of heavy path-loss faced by millimeter-wave systems necessitate new techniques such as hybrid beamforming (analog and digital), which are not present in 3G and 4G systems.

Aspects described herein provide methods and apparatus to generate a semi-persistent configuration of measurement reference signals (MRSs). As will be described in further detail herein, semi-persistent configuration of MRSs may be performed separately from activation of MRS training. By using a semi-persistent configuration for MRSs and MRS training, a Node B need not explicitly trigger measurements at a UE, which may avoid failures in transmitting the trigger message and misalignment of selected beams at the Node B and UE in some scenarios.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Some examples of UEs may include cellular phones, smart phones, personal digital assistants (PDAs), wireless modems, handheld devices, tablets, laptop computers, netbooks, smartbooks, ultrabooks, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link.

It is noted that while aspects may be described herein using terminology commonly associated with 3G and/or 4G wireless technologies, aspects of the present disclosure can be applied in other generation-based communication systems, such as 5G and later.

Example Wireless Communications Network

FIG. 1 illustrates an example wireless communication network 100, in which aspects of the present disclosure may be practiced. Techniques presented herein may be used for semi-persistent measurement reference symbol (MRS) configuration and measurement.

For example, NB 110 (eNB, BS, AP, TRP) may receive a message via a first beam from a UE (e.g., an MRS measurement report) and may transmit at least one signal for further refining the first beam or switching beams for communicating between the NB 110 and the UE. Correspondingly, a UE 120 may transmit to a NB, a message via a first beam (e.g., an MRS measurement report) and a subsequent message via a second beam (e.g., indicated in a beam switching message received from the NB 110).

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
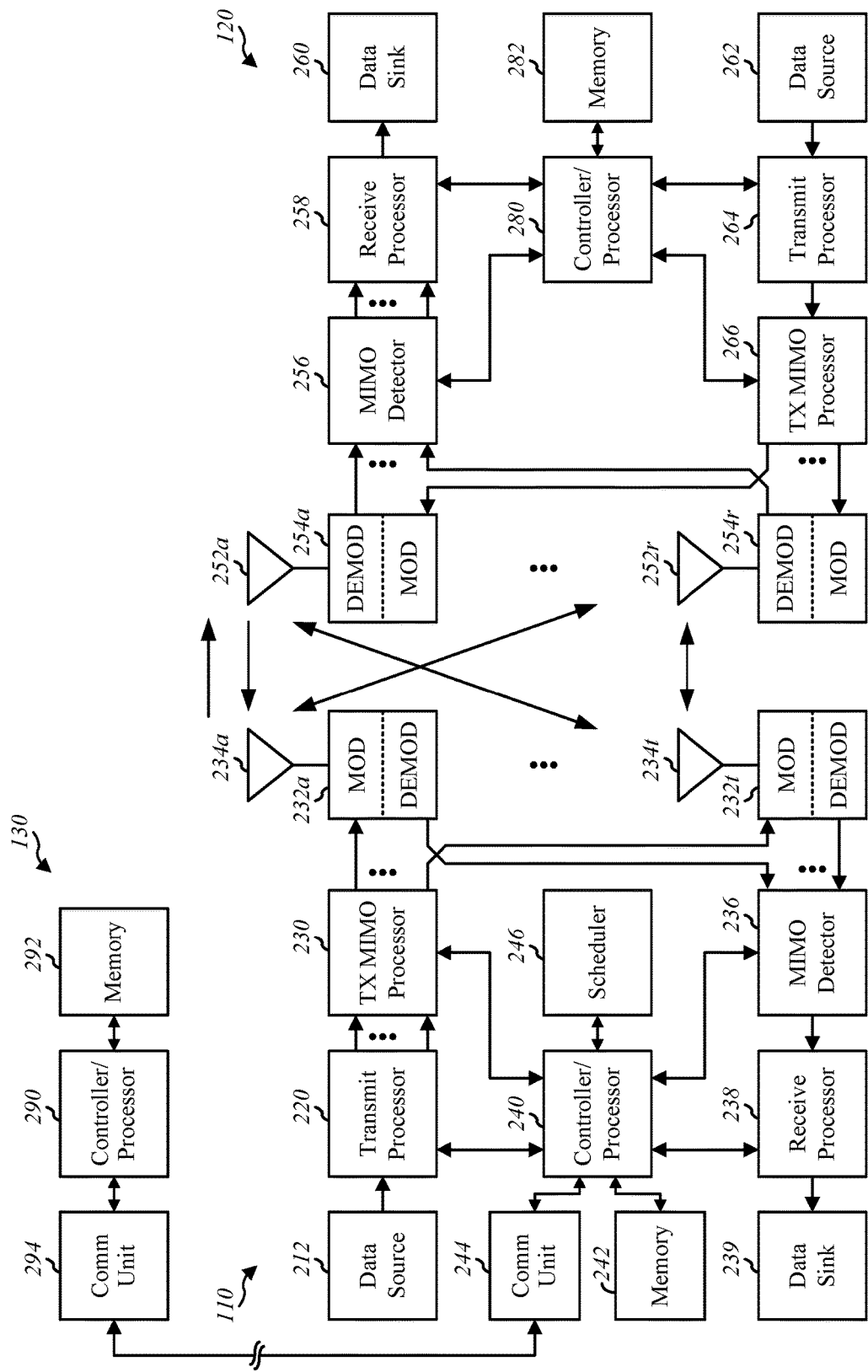
FIG. 2 shows a block diagram conceptually illustrating an example of a base station (BS) in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, Rnn, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively, to perform techniques presented herein for semi-persistent measurement reference symbol (MRS) configuration and measurement.

One or more modules illustrated in FIG. 2 may be configured to perform the operations described herein and illustrated in FIGS. 6-10. At the eNB, the controller/processor 240, scheduler 246, mod/demod 232, and/or antenna 234 may be configured to perform the recited and described operations. At the UE, the controller/processor 280, mod/demod 254, and antenna 252 may be configured to perform the recited and described operations.

Memories 242 and 282 may store data and program codes for base station 110 and UE 120, respectively. A scheduler 246 may schedule UEs for data transmission on the downlink and/or uplink.

Figure 3:
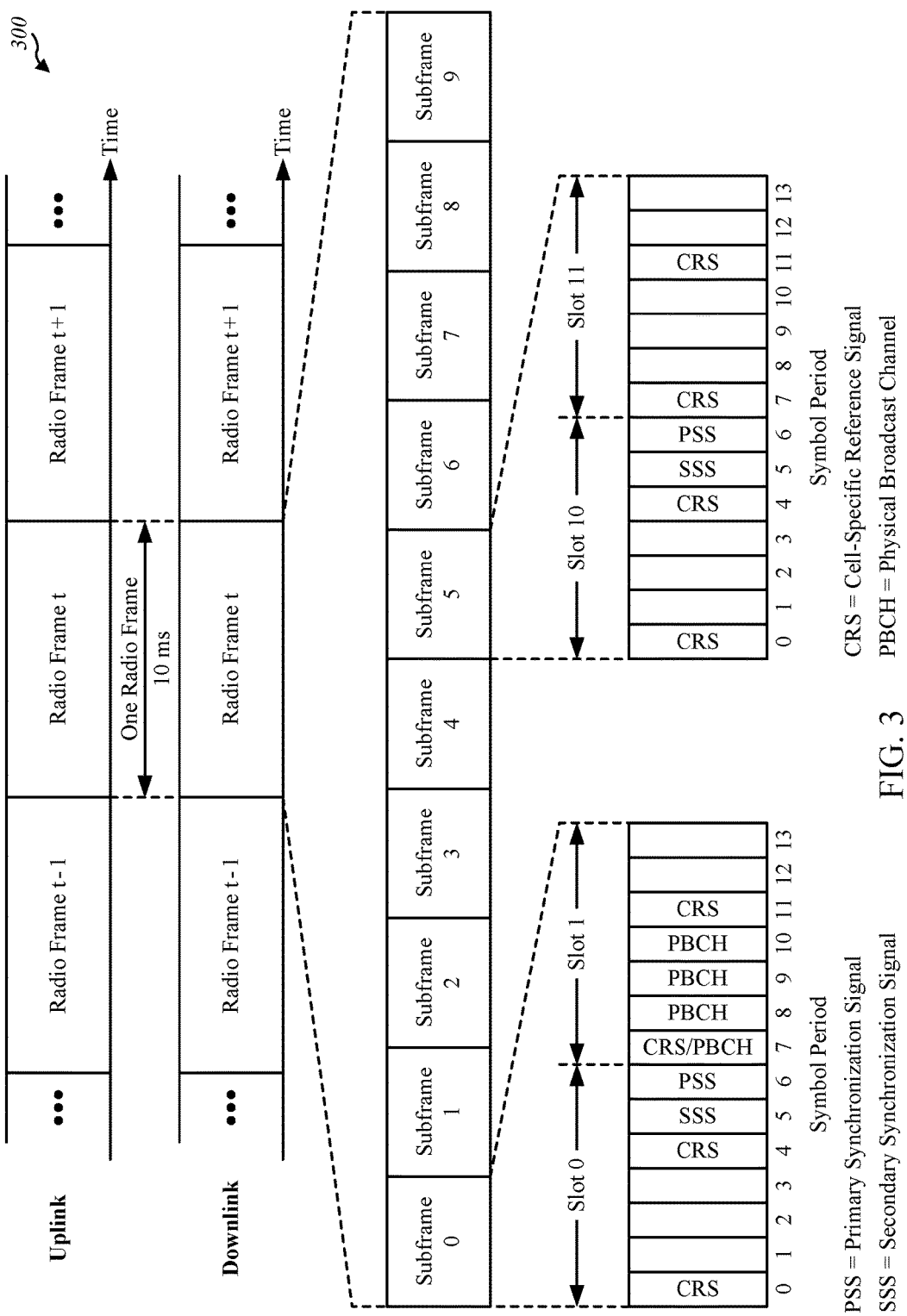
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
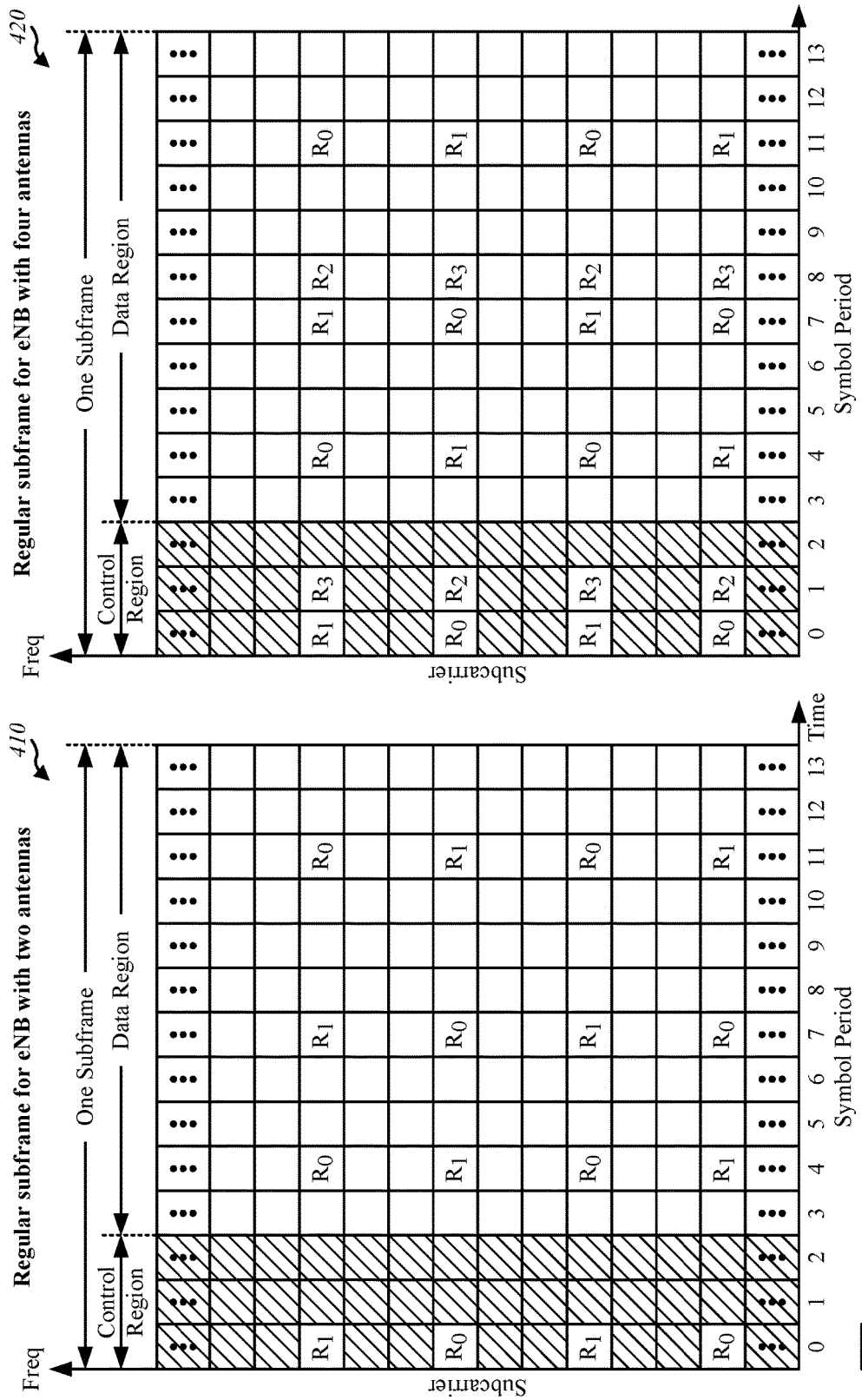
FIG. 4 is a block diagram conceptually illustrating two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Figure 5:
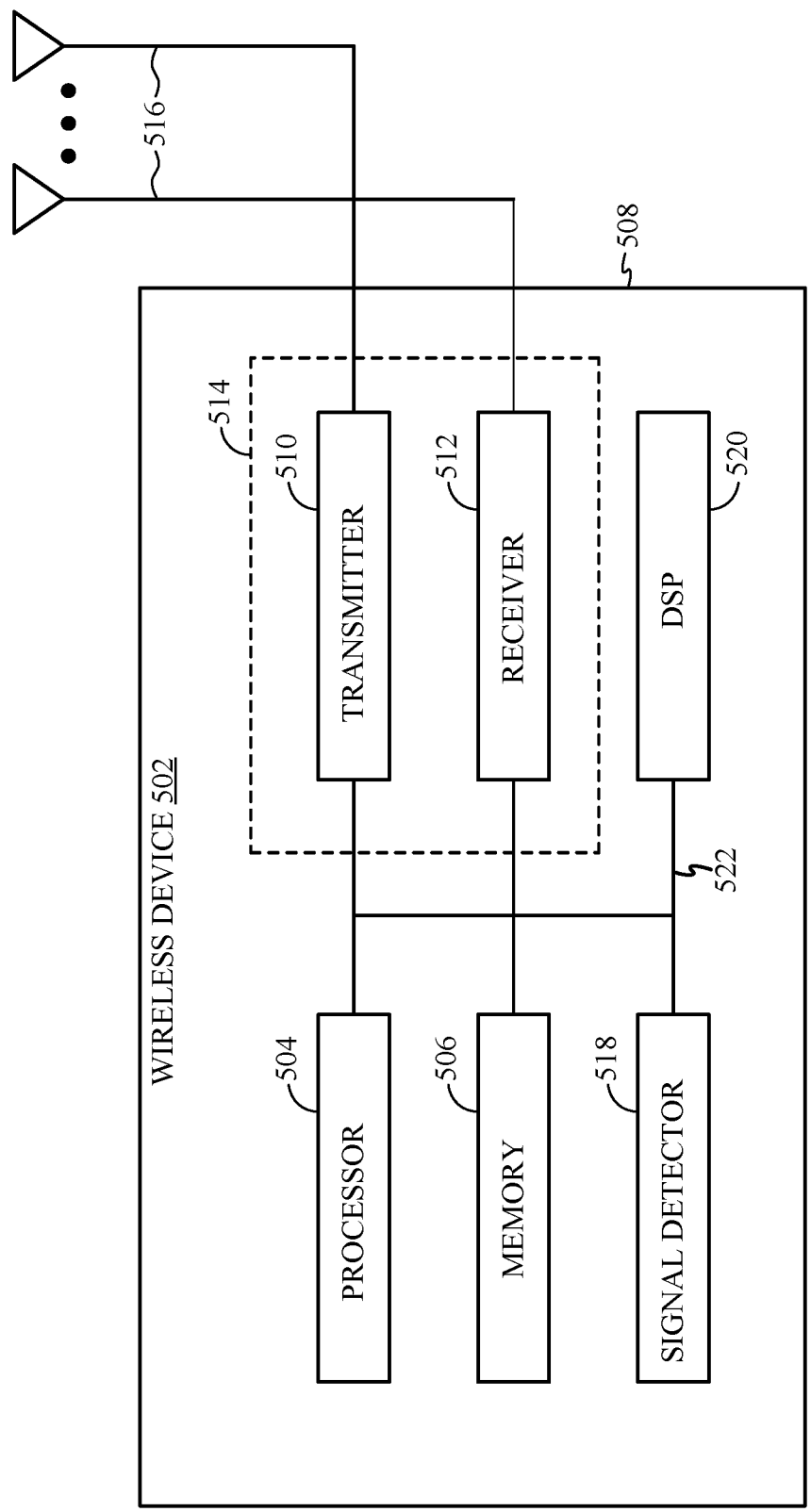
FIG. 5 illustrates various components that may be utilized in a wireless device, in accordance with certain aspects of the present disclosure.

FIG. 5 illustrates various components that may be utilized in a wireless device 502 that may be employed within the wireless communication system 100 illustrated in FIG. 1. The wireless device 502 is an example of a device that may be configured to implement the various methods described herein. The wireless device 502 may be a base station 110 or any of the wireless nodes (e.g., 120). For example, the wireless device 502 may be configured to perform operations and techniques illustrated in FIGS. 6-10 as well as other operations described herein.

The wireless device 502 may include a processor 504 that controls operation of the wireless device 502. The processor 504 may also be referred to as a central processing unit (CPU). Memory 506, which may include both read-only memory (ROM) and random access memory (RAM), provides instructions and data to the processor 504. A portion of the memory 506 may also include non-volatile random access memory (NVRAM). The processor 504 typically performs logical and arithmetic operations based on program instructions stored within the memory 506. The instructions in the memory 506 may be executable to implement the methods described herein. Some non-limiting examples of the processor 504 may include Snapdragon processor, application specific integrated circuits (ASICs), programmable logic, etc.

The wireless device 502 may also include a housing 508 that may include a transmitter 510 and a receiver 512 to allow transmission and reception of data between the wireless device 502 and a remote location. The transmitter 510 and receiver 512 may be combined into a transceiver 514. A single transmit antenna or a plurality of transmit antennas 516 may be attached to the housing 508 and electrically coupled to the transceiver 514. The wireless device 502 may also include (not shown) multiple transmitters, multiple receivers, and multiple transceivers. The wireless device 502 can also include wireless battery charging equipment.

The wireless device 502 may also include a signal detector 518 that may be used in an effort to detect and quantify the level of signals received by the transceiver 514. The signal detector 518 may detect such signals as total energy, energy per subcarrier per symbol, power spectral density and other signals. The wireless device 302 may also include a digital signal processor (DSP) 520 for use in processing signals.

The various components of the wireless device 502 may be coupled together by a bus system 522, which may include a power bus, a control signal bus, and a status signal bus in addition to a data bus. The processor 504 may be configured to access instructions stored in the memory 506 to perform beam refinement with aspects of the present disclosure discussed below.

Massive MIMO

Multiple-antenna (multiple-input multiple-output (MIMO)) technology is becoming common for wireless communications and has been incorporated into wireless broadband standards such as long term evolution (LTE) and Wi-Fi, for example. In MIMO, the more antennas the transmitter/receiver is equipped with, the more the possible signal paths (e.g., spatial streams) and the better the performance in terms of data rate and link reliability. Increased number of antennas can also involve increased complexity of the hardware (e.g., number of radio frequency (RF) amplifier frontends) and increased complexity and energy consumption of the signal processing at both ends.

Massive MIMO may involve the use of a very large number of service antennas (e.g., hundreds or thousands) that can be operated coherently and adaptively. The additional antennas may help focus the transmission and reception of signal energy into smaller regions of space. This can lead to huge improvements in throughput and energy efficiency, in particularly when combined with simultaneous scheduling of a large number of user terminals (e.g., tens or hundreds). Massive MIMO can be applied in time division duplex (TDD) operation and also in frequency division duplex (FDD) operation.

Example New Radio (NR)/5G Radio Access Network (RAN) Architecture

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 75 kHz over a 0.1 ms duration or a bandwidth of 15 kHz over a 1 ms duration. Each radio frame may consist of 10 or 50 subframes with a length of 10 ms. Each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 8 and 9.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS)—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 6:
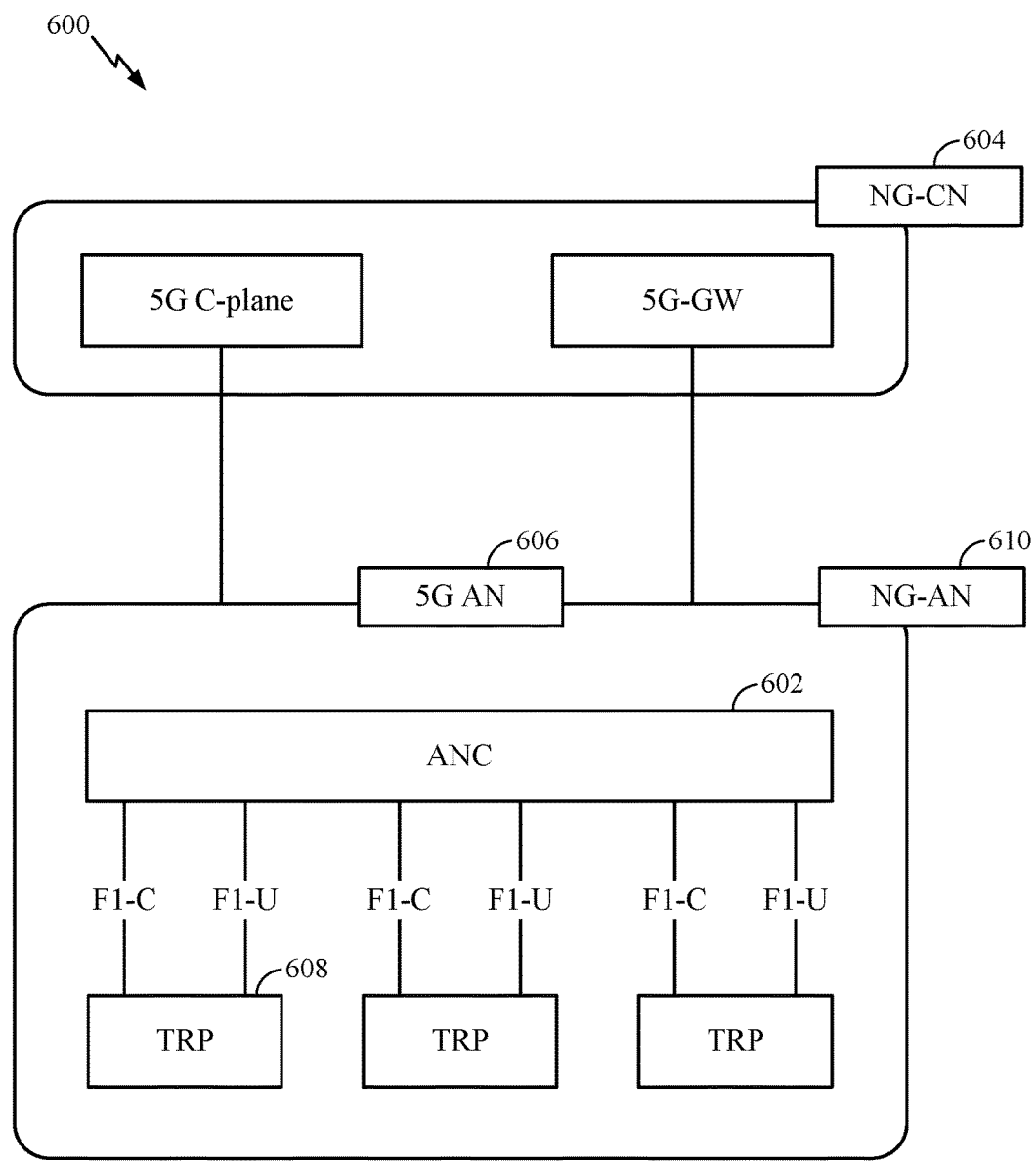
FIG. 6 illustrates an example logical architecture of a distributed radio access network (RAN), in accordance with certain aspects of the present disclosure.

FIG. 6 illustrates an example logical architecture of a distributed RAN 600, according to aspects of the present disclosure. A 5G access node 606 may include an access node controller (ANC) 602. The ANC may be a central unit (CU) of the distributed RAN 600. The backhaul interface to the next generation core network (NG-CN) 604 may terminate at the ANC. The backhaul interface to neighboring next generation access nodes (NG-ANs) may terminate at the ANC. The ANC may include one or more TRPs 608 (which may also be referred to as BSs, NR BSs, Node Bs, 5G NBs, APs, or some other term). As described above, a TRP may be used interchangeably with "cell."

The TRPs 608 may be a distributed unit (DU). The TRPs may be connected to one ANC (ANC 602) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 600 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 610 may support dual connectivity with NR. The NG-AN may share a common fronthaul for LTE and NR.

The architecture may enable cooperation between and among TRPs 608. For example, cooperation may be preset within a TRP and/or across TRPs via the ANC 602. According to aspects, no inter-TRP interface may be needed/present.

According to aspects, a dynamic configuration of split logical functions may be present within the architecture 600. The PDCP, RLC, MAC protocol may be adaptably placed at the ANC or TRP.

Figure 7:
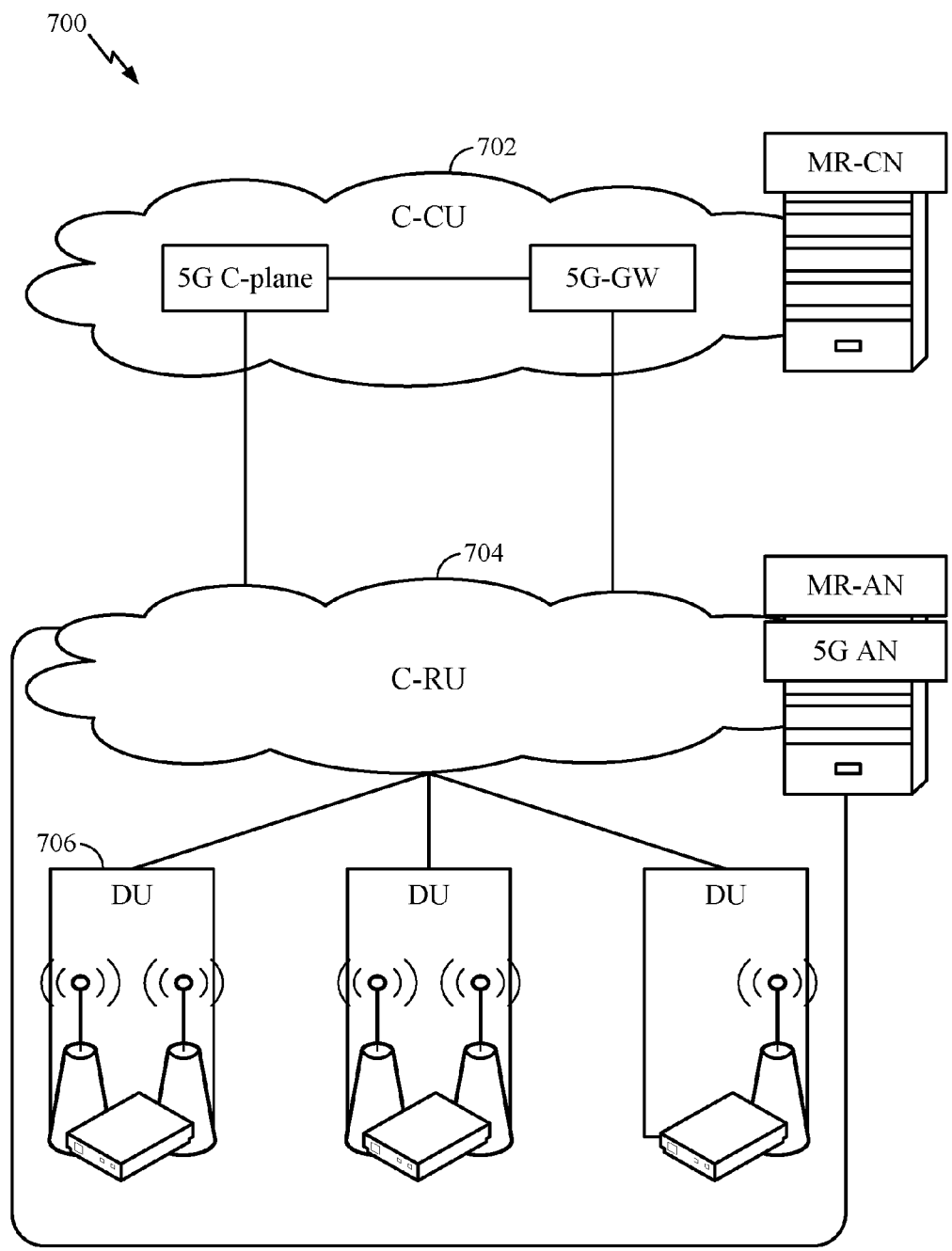
FIG. 7 illustrates an example physical architecture of a distributed RAN, in accordance with certain aspects of the present disclosure.

FIG. 7 illustrates an example physical architecture of a distributed RAN 700, according to aspects of the present disclosure. A centralized core network unit (C-CU) 702 may host core network functions. The C-CU may be centrally deployed. C-CU functionality may be offloaded (e.g., to advanced wireless services (AWS)), in an effort to handle peak capacity. A centralized RAN unit (C-RU) 704 may host one or more ANC functions. Optionally, the C-RU may host core network functions locally. The C-RU may have distributed deployment. The C-RU may be closer to the network edge. A distributed unit (DU) 706 may host one or more TRPs. The DU may be located at edges of the network with radio frequency (RF) functionality.

Figure 8:
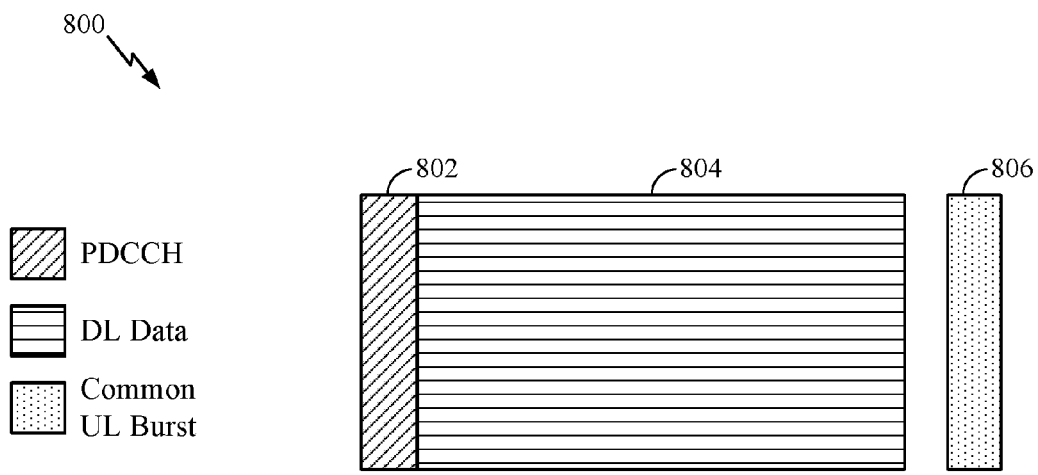
FIG. 8 is a diagram illustrating an example of a downlink (DL)-centric subframe, in accordance with certain aspects of the present disclosure.

FIG. 8 is a diagram 800 showing an example of a DL-centric subframe. The DL-centric subframe may include a control portion 802. The control portion 802 may exist in the initial or beginning portion of the DL-centric subframe. The control portion 802 may include various scheduling information and/or control information corresponding to various portions of the DL-centric subframe. In some configurations, the control portion 802 may be a physical DL control channel (PDCCH), as indicated in FIG. 8. The DL-centric subframe may also include a DL data portion 804. The DL data portion 804 may sometimes be referred to as the payload of the DL-centric subframe. The DL data portion 804 may include the communication resources utilized to communicate DL data from the scheduling entity (e.g., UE or BS) to the subordinate entity (e.g., UE). In some configurations, the DL data portion 804 may be a physical DL shared channel (PDSCH).

The DL-centric subframe may also include a common UL portion 806. The common UL portion 806 may sometimes be referred to as an UL burst, a common UL burst, and/or various other suitable terms. The common UL portion 806 may include feedback information corresponding to various other portions of the DL-centric subframe. For example, the common UL portion 806 may include feedback information corresponding to the control portion 802. Non-limiting examples of feedback information may include an ACK signal, a NACK signal, a HARQ indicator, and/or various other suitable types of information. The common UL portion 806 may include additional or alternative information, such as information pertaining to random access channel (RACH) procedures, scheduling requests (SRs), and various other suitable types of information. As illustrated in FIG. 8, the end of the DL data portion 804 may be separated in time from the beginning of the common UL portion 806. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 9:
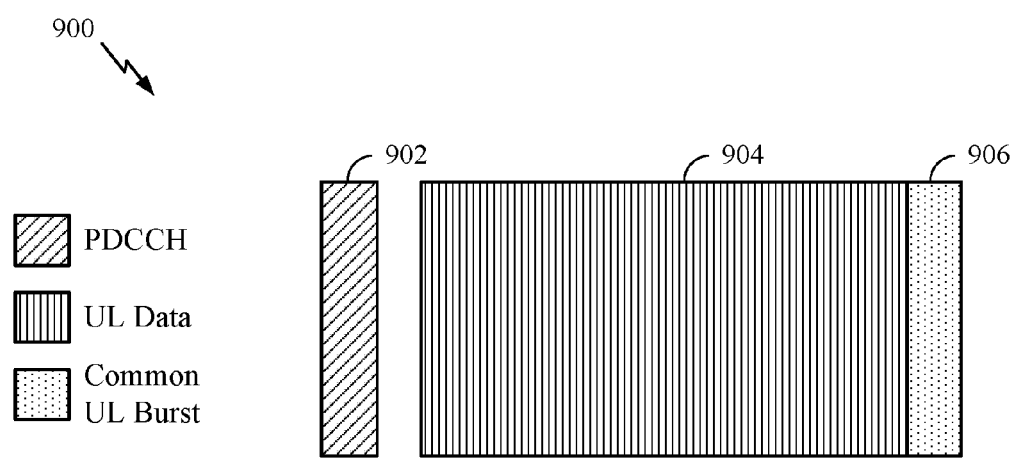
FIG. 9 is a diagram illustrating an example of an uplink (UL)-centric subframe, in accordance with certain aspects of the present disclosure.

FIG. 9 is a diagram 900 showing an example of an UL-centric subframe. The UL-centric subframe may include a control portion 902. The control portion 902 may exist in the initial or beginning portion of the UL-centric subframe. The control portion 902 in FIG. 9 may be similar to the control portion 902 described above with reference to FIG. 9. The UL-centric subframe may also include an UL data portion 904. The UL data portion 904 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 902 may be a physical DL control channel (PDCCH).

As illustrated in FIG. 9, the end of the control portion 902 may be separated in time from the beginning of the UL data portion 904. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 906. The common UL portion 906 in FIG. 9 may be similar to the common UL portion 906 described above with reference to FIG. 9. The common UL portion 906 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example Semi-Persistent Reference Symbol (RS) Configuration And Measurement

In beam management procedures used in determining a beam pairing for communications between a UE and a TRP, reference signals, such as measurement reference signals (MRSs) (also referred to as channel state information reference signals (CSI-RSs)) or sounding reference signals (SRSs), may be transmitted to a UE. In response, the UE may generate a measurement report based on a received RS (e.g., an SRS received on a periodic basis, a CSI-RS (MRS) intended for a specific UE, or the like). The RSs may be semi-static (e.g., the same pattern over time), which may allow the TRP to obtain consistent measurements, or dynamic (e.g., configured on demand for each UE).

In some cases, a TRP obtains measurements from a UE by transmitting a measurement trigger to the UE. The measurement trigger generally indicates that the UE is to perform measurements on RSs transmitted in certain symbols in a current or subsequent subframe (e.g., SRSs received on a periodic basis, CSI-RSs (MRSs) intended for a specific UE, and the like). The measurement trigger may be transmitted on a physical downlink control channel (PDCCH) or in a media access control (MAC) control element (CE) (MAC-CE).

In some cases, in response to receiving a CSI-RS (MRS), the UE measures the received CSI-RS (MRS) and generates a report including one or more of the measurement reference signal received power (MRS-RP) and measurement reference signal identifier (MRS-ID). The report may be transmitted from the UE to the TRP over the physical uplink control channel (PUCCH) or physical uplink shared channel (PUSCH). The TRP uses the received reports to determine a beam pair for the TRP and UE to use for subsequent communications and can communicate the beam selection to the UE (e.g., in a beam switching message).

In highly dynamic cases, where a UE is moving at high speed, transmission of a measurement trigger each time the TRP is to obtain RS measurements from a UE may fail, as the serving beam may degrade rapidly in such a situation. Additionally, transmission of the measurement trigger on PDCCH and/or using a MAC-CE may increase an amount of overhead in communicating between the TRP and UE. For example, if the TRP does not have data to transmit to a target UE or when the TRP schedules transmissions to other UEs and there is insufficient time to schedule the target UE, transmission of the measurement trigger on PDCCH and/or using a MAC-CE may increase overhead. Further, the beam switching indication may not be explicitly acknowledged by the UE or, if acknowledged, some of the acknowledgment messages may be lost due to a higher number of acknowledgment events. A lost beam switching message may misalign the TRP and UE, which may trigger a beam recovery procedure and the additional overhead that may be entailed by the execution of a beam recovery procedure between the TRP and UE.

To reduce an amount of overhead involved in requesting MRS measurements and reduce a likelihood that the MRS training fails (e.g., due to the UE not successfully receiving an MRS), aspects of the present disclosure may use a semi-persistent MRS configuration to configure MRS measurement separately from activation of MRS measurement. A semi-persistent MRS configuration may include, for example, a periodicity at which the TRP transmits MRSs, a number of symbols used for training in a subframe in which MRSs are transmitted, an inactivity timer indicating an expiration of the semi-persistent MRS configuration if the inactivity timer expires (e.g., from the TRP not transmitting MRSs during the duration of the inactivity timer or the UE not detecting MRSs during the duration of the inactivity timer), and so on. As discussed, transmission of the MRS configuration to a UE may be performed independently of activation of MRS training, which may allow a TRP to configure and initiate MRS training without the transmission (and, in some cases, uncertain reception) of a measurement trigger at the UE from which RS measurements are requested.

In some cases, the semi-persistent MRS configuration may be transmitted using radio resource control (RRC) signaling. Transmission of the semi-persistent MRS configuration may reduce overhead in transmitting an MRS trigger message over PDCCH and/or MAC-CE signaling when the TRP does not have other data to transmit to the target UE or if other UEs are scheduled and there is insufficient time to schedule PDCCH and/or MAC-CE transmissions for the target UE.

Figure 10:
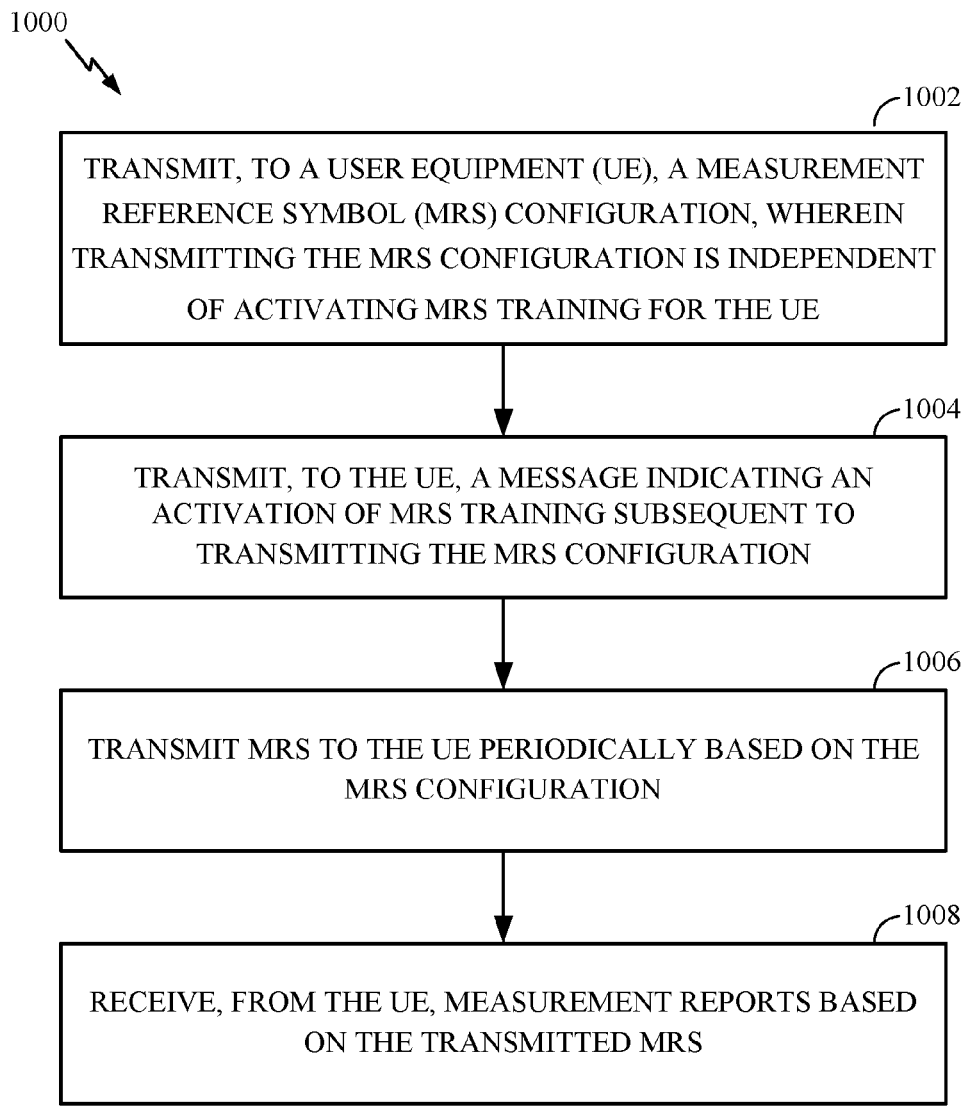
FIG. 10 illustrates example operations performed, by a Transmit Receive Point (TRP), in accordance with certain aspects of the present disclosure.

FIG. 10 illustrates example operations that may be performed by a TRP for semi-persistent configuration of MRS measurements, according to an aspect of the present disclosure. As illustrated, operations 1000 begin at 1002, where the TRP transmits, to a user equipment (UE), an MRS configuration. As discussed above, transmission of the MRS configuration may be independent of activating MRS training for the UE. The MRS configuration, as discussed above, may include information indicating a periodicity at which MRSs are transmitted, an inactivity timer indicating an expiration time of the MRS configuration (e.g., relative to the last reception of an MRS at the UE), and the like.

At 1004, the TRP transmits, to the UE, a message indicating an activation of MRS training subsequent to transmission of the MRS configuration. At 1006, the TRP transmits MRS to the UE periodically based on the MRS configuration. As discussed above, the TRP may transmit MRS according to a periodicity indicated in the MRS configuration in one or more locations in a subframe (e.g., symbols) indicated in the MRS configuration. At 1008, the TRP receives, from the UE, measurement reports based on the transmitted MRS.

Figure 11:
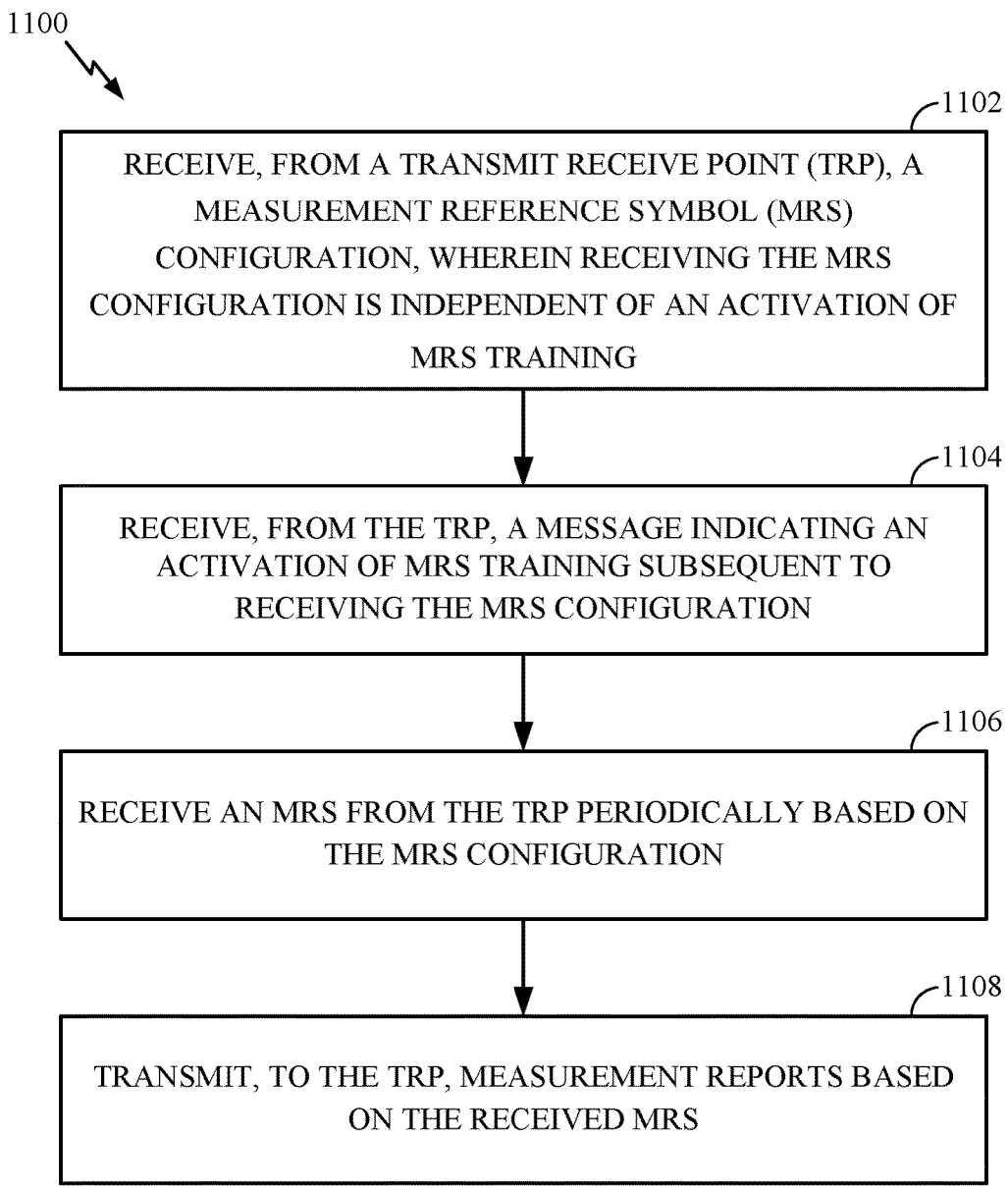
FIG. 11 illustrates example operations performed by a UE, in accordance with certain aspects of the present disclosure.

FIG. 11 illustrates example operations that may be performed by a UE for performing MRS measurements based on a semi-persistent MRS configuration received from a TRP, according to an aspect of the present disclosure. As illustrated, operations 1100 begin at 1102, where the UE receives, from a TRP, an MRS configuration. Receiving the MRS configuration may be independent of an activation of MRS training.

At 1104, the UE receives, from the TRP, a message indicating an activation of MRS training subsequent to receiving the MRS configuration. When the UE receives the message indicating activation of MRS training, the UE can monitor one or more subframes for MRSs based on the periodicity and location indicated in the MRS configuration.

At 1106, the UE receives an MRS periodically based on the MRS configuration. At 1108, the UE transmits, to the TRP, measurement reports based on the received MRS. Transmission of measurement reports to the TRP may occur at a regular interval based on the periodicity at which the TRP transmits MRS to the UE indicated in the MRS configuration.

Based on the measurement reports transmitted by the UE, the TRP can determine a set of beams to be used by the TRP and the UE for use in subsequent transmissions. To communicate the new set of beams, the TRP can transmit an explicit beam switching message to the UE. The beam switching message may be transmitted, for example, over PDCCH. The receiving UE may respond to the beam switching message with an ACK transmitted on PUCCH.

In some cases, the TRP may determine, a priori, a set of beam switching patterns associated with a direction of travel and speed of a UE. For example, if the TRP has information indicating that the UE is moving in a particular direction at a particular speed, the TRP can predict a beam switching pattern. Using the prediction, the TRP can instruct the UE to switch beams periodically (e.g., according to a predefined beam switching pattern and direction of travel).

Figure 12:
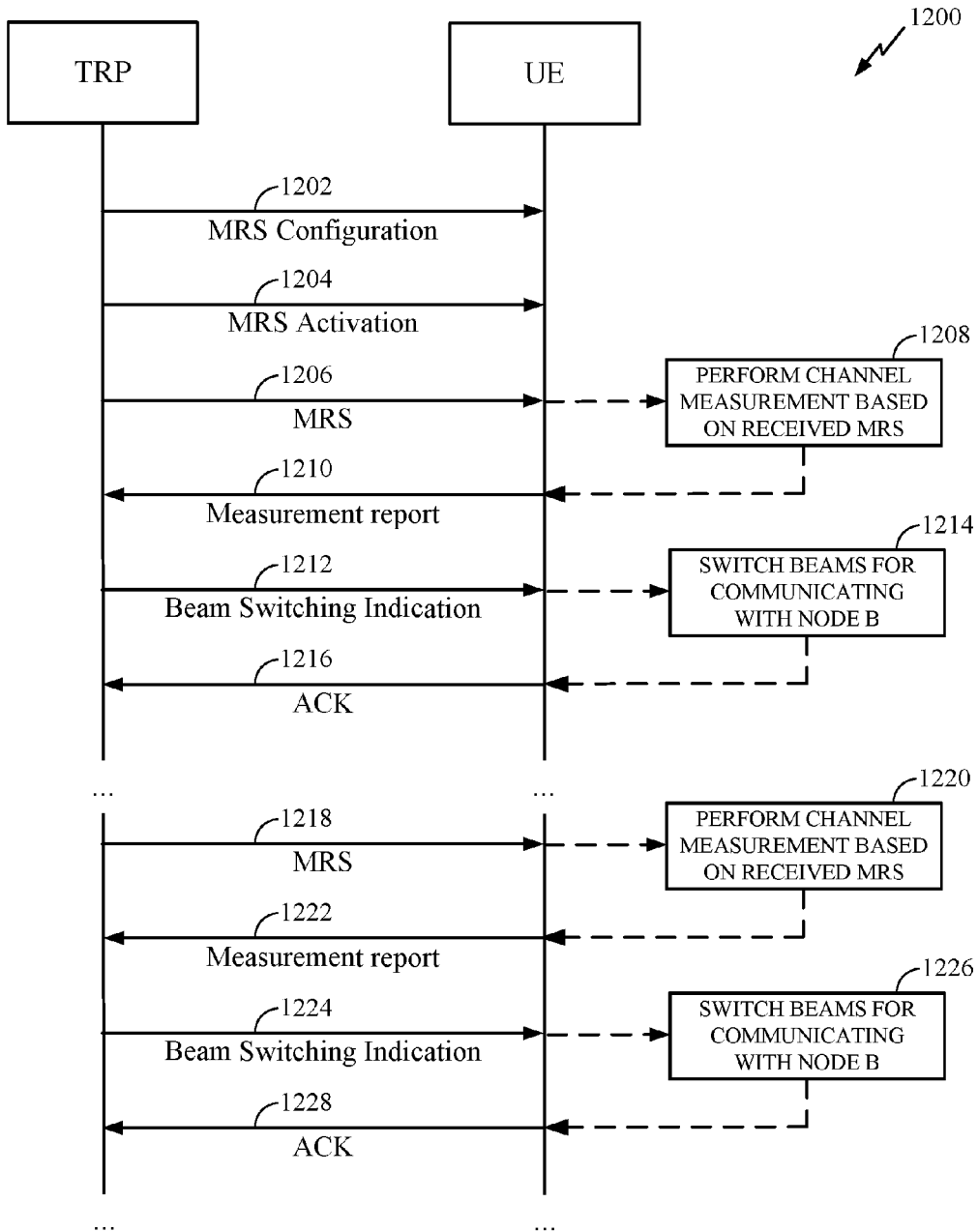
FIG. 12 is a call flow diagram illustrating an example message exchange between a TRP and a UE for configuring and activating RS training, in accordance with certain aspects of the present disclosure.

FIG. 12 illustrates an example call flow 1200 of messages exchanged between a TRP and a UE for performing MRS measurements using a semi-persistent MRS configuration, according to an aspect of the present disclosure. As noted above, the TRP can transmit an MRS configuration indicating a periodicity and location of MRSs that the UE can use to generate measurement reports for the MRSs, which may be transmitted to the TRP. Based on the received generated measurement reports, the TRP can determine a set of beams to be used by the TRP and UE for communications and can transmit a beam switching message to the UE, which the UE can explicitly acknowledge.

As illustrated, a UE can receive an MRS configuration 1202 which indicates a periodicity and location of MRSs but need not activate MRS training. Subsequently, in a separate MRS activation message 1204, the UE can receive an indication that MRS training is active. Based on the periodicity and location information in MRS configuration 1202, the UE can monitor for MRS transmitted from the TRP.

The UE generally receives, from the TRP, an MRS 1206 in one or more symbols of a subframe. At 1208, the UE performs channel measurements based on the received MRS and generates a measurement report 1210, which is transmitted to the TRP. In some cases, the UE may additionally reset an inactivity timer used in determining whether to assume that MRS training has been deactivated based on the reception of the MRS. The TRP can use the measurement report to generate a beam switching indication message 1212 indicating a set of beams that the UE and TRP can use for subsequent communications. Based on beam switching indication message 1212, the UE switches beams for communicating with the TRP at 1214 and transmits an acknowledgment 1216 to the TRP.

In a subsequent time period, because MRS has previously been configured and MRS training has previously been activated (e.g., in MRS configuration 1202 and MRS activation message 1204), the TRP may transmit MRS 1218 to the UE without transmitting an MRS trigger message to the UE. The UE, at 1220, performs channel measurement based on the received MRS and generates measurement report 1222 for transmission to the TRP. The beam switching indication message 1224 transmitted from the TRP and generated based on the measurement report 1222 may prompt the UE, at 1226, to switch beams for communicating with the TRP and transmit an acknowledgment 1228 of the beam switching indication message 1224 to the TRP. This call flow may continue until the TRP deactivates MRS training (either explicitly or by not transmitting MRS for an inactivity timer period).

In some cases, the TRP may schedule a data transmission during a time period in which an MRS is configured to be transmitted to the UE. To inform a UE that a data transmission will be performed while MRS training is active, the TRP can notify the UE using a PDCCH message. The PDCCH message may use a cell radio network temporary identity (C-RNTI) to schedule the UE with data. In some cases, when a data transmission is scheduled during a time period in which an MRS is configured to be transmitted to the UE, the TRP can skip transmission of an MRS during the time period.

Figure 13:
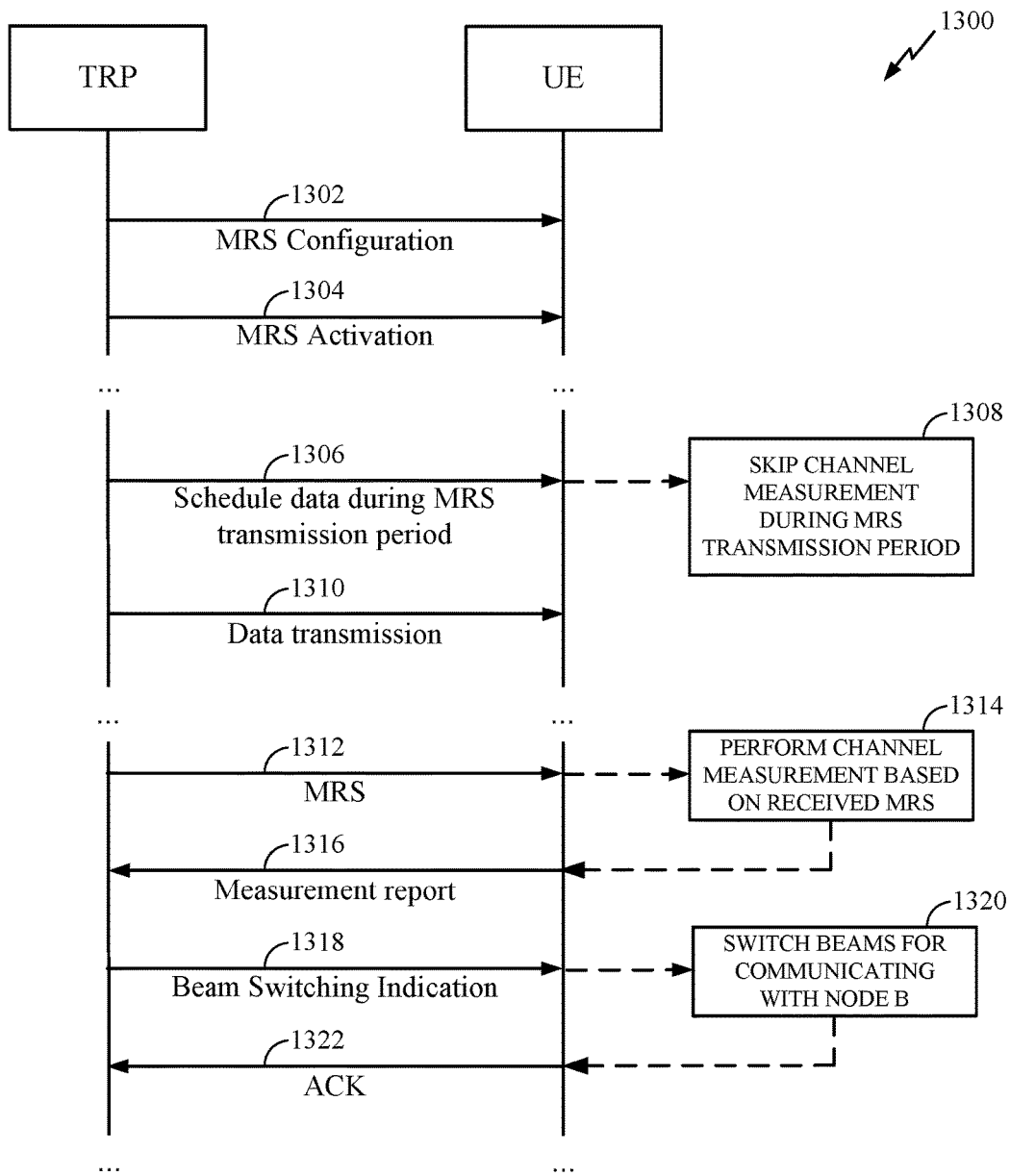
FIG. 13 is a call flow diagram illustrating an example transmission of data between a TRP and a UE during a scheduled RS transmission period, in accordance with certain aspects of the present disclosure.

FIG. 13 is a call flow diagram illustrating an example message flow 1300 between a TRP and a UE to schedule a data transmission during a scheduled MRS transmission period, according to an aspect of the present disclosure.

As illustrated, the UE may receive an MRS configuration 1302 indicating at least a periodicity and location of MRS signals transmitted by TRP for MRS measurement. Subsequently the UE may receive an MRS activation message 1304 indicating that MRS training is active.

While MRS training is active, the UE may receive a message 1306 scheduling a data transmission during an MRS transmission period. Based on the message, at 1308, the UE skips channel measurement during the MRS transmission period (e.g., may not attempt decoding an MRS at the indicated location). The UE may subsequently receive a data transmission 1310.

Subsequently, at the next scheduled MRS transmission period, the UE receives an MRS 1312 at the location in a subframe indicated in MRS configuration 1302. At 1314, the UE performs channel measurement based on the received MRS and after generating measurement report 1316, transmits measurement report 1316 to the TRP. In response, the TRP may transmit a beam switching indication 1318, which the UE receives and uses at 1320 to switch beams for communicating with the TRP. The UE transmits an acknowledgment 1322 of beam switching indication 1318 to the TRP. MRS measurement and beam switching may continue until the TRP deactivates MRS training (explicitly or by not transmitting MRS for the duration of an inactivity timer).

As discussed above, the MRS configuration may include an inactivity timer. If the TRP does not configure MRS training, or upon skipping transmission of MRSs for the duration of the inactivity timer, the UE may assume that MRS training procedures have been deactivated. In some cases, the TRP can explicitly deactivate MRS training procedures by transmitting a message indicating a deactivation of MRS training. The message may be transmitted, for example, on PDCCH. When a UE determines that MRS training has been deactivated, the UE need not attempt to decode MRS at the location and periodicity indicated in a previously received MRS configuration.

In some cases, MRS training need not be accompanied by a data transmission for a UE, and the MRS need not use an entire subframe. In such a case, the remaining portion of the subframe (i.e., the portion not used for MRS) may be used to schedule transmissions to other UEs. A scheduling grant may be used to indicate the fraction of the subframe that is dedicated to schedule transmissions to other UEs. The UE for which MRS training is active may wake up for MRS training before the portion of the subframe including the MRS is scheduled to be received at the UE.

While the foregoing is described in the scope of measurement reference signals (MRSs) (also referred to as channel state information reference signals (CSI-RSs)), it should be recognized that the techniques described herein for configuring the transmission of and transmitting reference signals may be applied to other types of reference signals.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in figures, those operations may have corresponding counterpart means-plus-function components.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a transmit receive point (TRP), comprising:
   transmitting, to a user equipment (UE), a reference symbol (RS) configuration, wherein transmitting the RS configuration is independent of activating RS training for the UE;
   transmitting, to the UE, a message indicating an activation of RS training subsequent to transmitting the RS configuration;
   transmitting RSs to the UE periodically based on the RS configuration;
   receiving, from the UE, measurement reports based on the transmitted RS; and
   skipping transmission of an RS for an inactivity period to deactivate RS training.

2. The method of claim 1, wherein the RS comprises a measurement reference symbol (MRS).

3. The method of claim 1, wherein the RS configuration is transmitted using radio resource control (RRC) signaling.

4. The method of claim 1, wherein the RS configuration comprises one or more of a periodicity in which RS signals are transmitted, a number and location of training symbols in a subframe, and an inactivity timer.

5. The method of claim 1, wherein the message indicating an activation of RS training comprises a message transmitted on a physical downlink control channel (PDCCH).

6. The method of claim 1, wherein the message indicating an activation of RS training comprises an indication included in a media access control (MAC) control element (CE).

7. The method of claim 1, further comprising:
   scheduling a data transmission during a period in which RS training is active and an RS is to be transmitted, and
   during the period in which an RS is to be transmitted, skipping transmission of an MRS.

8. The method of claim 1, further comprising:
   transmitting, to the UE, a message indicating deactivation of RS training.

9. The method of claim 8, wherein the message indicating deactivation of RS training comprises a message transmitted on a physical downlink control channel (PDCCH).

10. The method of claim 1, further comprising:
    based, at least in part, on the received measurement reports, transmitting a beam switching indication to the UE; and
    receiving an acknowledgment, from the UE, for the beam switching indication.

11. The method of claim 10, wherein the beam switching indication is based on a predefined beam switching pattern and a direction of travel of the UE.

12. A method for wireless communications by a user equipment (UE), comprising:
    receiving, from a Transmit Receive Point (TRP), a reference symbol (RS) configuration, wherein receiving the RS configuration is independent of an activation of RS training;
    receiving, from the TRP, a message indicating an activation of RS training subsequent to receiving the RS configuration;
    receiving an RS from the TRP periodically based on the RS configuration;
    transmitting, to the TRP, measurement reports based on the received RS; and
    after detecting that RS has not been transmitted for an inactivity period, determining that RS training has been deactivated.

13. The method of claim 12, wherein the RS comprises a measurement reference symbol (MRS).

14. The method of claim 12, wherein the RS configuration is received via radio resource control (RRC) signaling.

15. The method of claim 12, wherein the RS configuration comprises one or more of a periodicity in which RS signals are transmitted, a number and location of training symbols in a subframe, and an inactivity timer.

16. The method of claim 12, wherein the message indicating an activation of RS training comprises a message transmitted on a physical downlink control channel (PDCCH).

17. The method of claim 12, wherein the message indicating an activation of RS training comprises an indication included in a media access control (MAC) control element (CE).

18. The method of claim 12, further comprising:
    receiving an indication that data transmission is scheduled during a period in which RS training is active and an RS is to be received from the TRP; and during the period in which an RS is to be received, skipping decoding of an RS for generating a measurement report.

19. The method of claim 12, further comprising:
receiving, from the TRP, a message indicating deactivation of RS training.

20. The method of claim 19, wherein the message indicating deactivation of RS training comprises a message transmitted on a physical downlink control channel (PDCCH).

21. The method of claim 12, further comprising:
receiving, from the TRP, a beam switching indication based on the transmitted measurement report; and
transmitting, to the TRP, an acknowledgment to the beam switching indication.

22. The method of claim 21, wherein the beam switching indication is based on a predefined beam switching pattern and a direction of travel of the UE.

23. An apparatus for wireless communications, comprising:
a processor configured to:
transmit, to a user equipment (UE), a reference symbol (RS) configuration, wherein transmitting the RS configuration is independent of activating RS training for the UE,
transmit, to the UE, a message indicating an activation of RS training subsequent to transmitting the RS configuration,
transmit RSs to the UE periodically based on the RS configuration,
receive, from the UE, measurement reports based on the transmitted RS, and
skip transmission of an RS for an inactivity period to deactivate RS training; and
a memory coupled to the processor.

24. The apparatus of claim 23, wherein the processor is further configured to:
schedule a data transmission during a period in which RS training is active and an RS is to be transmitted, and
during the period in which an RS is to be transmitted, skip transmission of an RS.

25. The apparatus of claim 23, wherein the processor is further configured to:
based, at least in part, on the received measurement reports, transmit a beam switching indication to the UE; and
receive an acknowledgment, from the UE, for the beam switching indication message.

26. An apparatus for wireless communications, comprising:
a processor configured to:
receive, from a Transmit Receive Point (TRP), a reference symbol (RS) configuration, wherein receiving the RS configuration is independent of an activation of RS training,
receive, from the TRP, a message indicating an activation of RS training subsequent to receiving the RS configuration,
receive an RS from the TRP periodically based on the RS configuration,
transmit, to the TRP, measurement reports based on the received RS, and
after detecting that RS has not been transmitted for an inactivity period, determine that RS training has been deactivated; and
a memory coupled to the processor.

27. The apparatus of claim 26, wherein the processor is further configured to:
receive an indication that data transmission is scheduled during a period in which RS training is active and an RS is to be received from the TRP; and
during the period in which an RS is to be received, skip decoding of an RS for generating a measurement report.

28. The apparatus of claim 26, wherein the processor is further configured to:
receive, from the TRP, a beam switching indication based on the transmitted measurement report; and
transmit, to the TRP, an acknowledgment to the beam switching indication.

* * * * *